Oct. 25, 1927.
J. K. CURRY
1,646,527
FRUIT JUICE EXTRACTOR
Filed Sept. 21, 1923
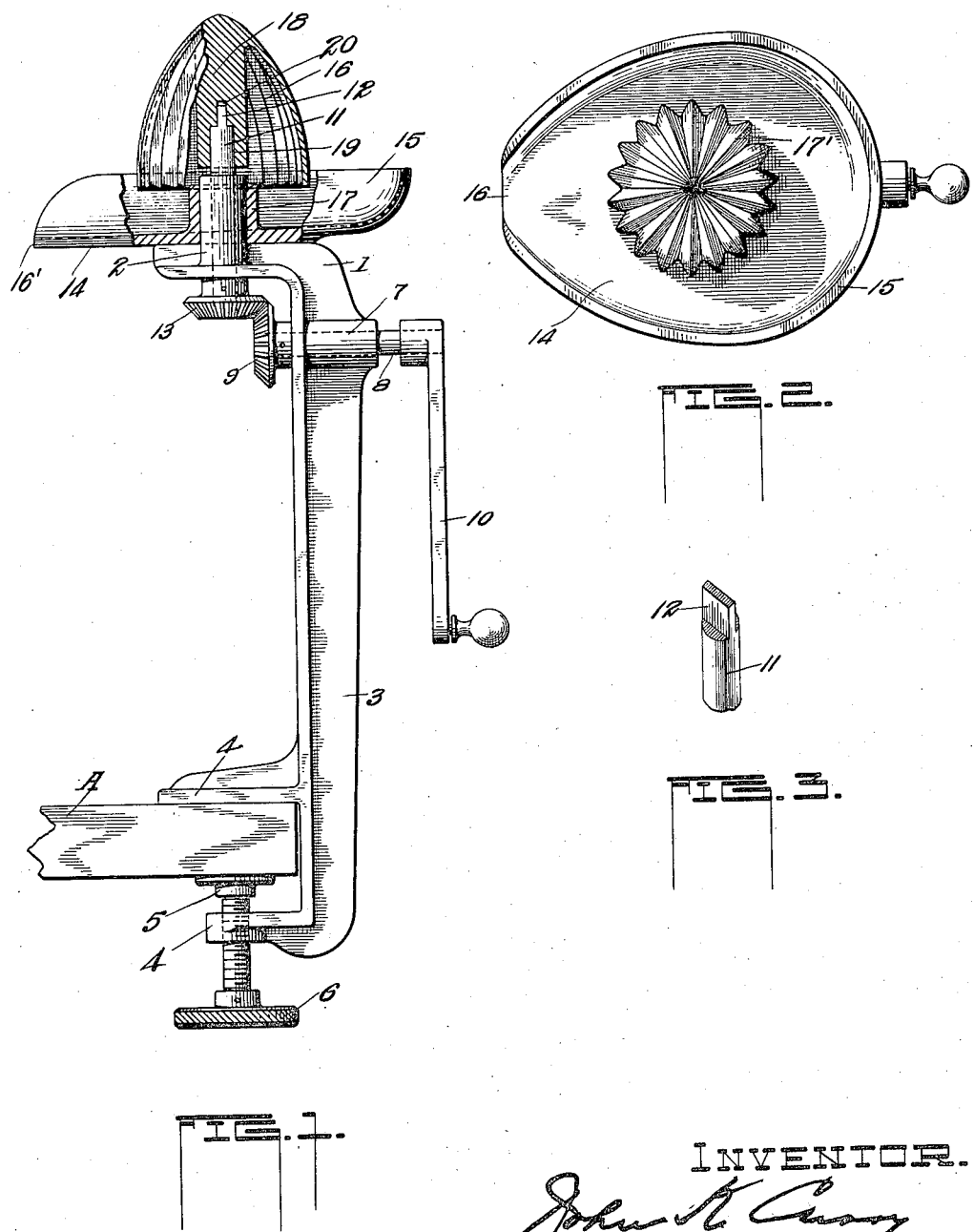

Patented Oct. 25, 1927.

1,646,527

UNITED STATES PATENT OFFICE.

JOHN K. CURRY, OF PEORIA, ILLINOIS.

FRUIT-JUICE EXTRACTOR.

Application filed September 21, 1923. Serial No. 664,092.

This invention has reference to fruit juice extractors and it has for its principal object to provide an extractor of the character referred to which is simple in construction, containing the fewest number of parts and therefore capable of being manufactured in quantities at small cost.

It is a further object of my invention to provide a sanitary fruit juice extractor and to this end there is provided a frame, a juice receiving saucer resting freely and movable on the frame, an operating shaft journaled in the frame and protruding above the saucer and a corrugated or fluted juice extracting head capable of engagement with the shaft to be rotated thereby; these parts arranged to be assembled with convenience and ease and as easily disassembled for cleansing purposes.

That the invention may be more fully understood, reference is had to the accompanying drawings forming a part of the description and illustrating a preferred embodiment of the invention, in which:—

Fig. 1 is a side elevation, partly in section, showing a fruit juice extractor embodying my invention;

Fig. 2 is a top plan view showing the saucer and rotatable head, and

Fig. 3 is a detail in perspective showing the end of the operating shaft which connects with the head.

Like characters of reference denote corresponding parts throughout the figures.

Referring to the drawings, 1 designates a frame provided with a tubular upstanding bearing sleeve 2; said frame being additionally provided with a supporting member 3 from the lower portion of which extend the jaws 4 adapted to fit over a table, bench or other support A, and the lower jaw has a clamp 5 carried on a thumb screw 6 for securing the supporting member of the frame in place, substantially as shown. Said supporting member 3 just below the frame has a bearing 7 in which is journaled a driving shaft 8 on the inner end of which is a bevel gear 9 and attached to its opposite or outer end is a crank handle 10 for turning said shaft and gear.

Extending up thru the frame 1 and the tubular bearing sleeve 2 thereon is an operating shaft 11, its upper end protruding thru and beyond the upper end of the sleeve 2 and cut away on two sides, as at 12, and to the lower end of said shaft 11 is connected a bevel gear wheel 13 meshing with the gear wheel 9, when the shafts 8 and 11 are assembled and journaled in the frame structures, the gears 9 and 13 hold the said shafts in their proper place and in relation to each other, as will be apparent.

14 designates a saucer formed or provided with an upstanding surrounding flange 15 cut away at 16, at what may be termed the mouth portion of the saucer. Said saucer and its flange, in plan has somewhat the appearance of an egg with the mouth 16 at the small end and with the flange curved toward the mouth, whereby to discharge the collected juices through a contracted mouth to facilitate the easy flow or pouring of the juices from said saucer. At an approximately central point in the saucer there arises a tubular boss 17 which permits the saucer to rest freely and move on the frame 1 with the bearing sleeve 2 extending upwardly and within said boss, and with the shaft 11 protruding above the boss and bearing sleeve, as best seen in Fig. 1.

The fruit juice extracting head 16 is preferably a hollow substantially cone shaped member provided with a convex corrugated surface 17 and depending from the inner apex of the cone is a bearing boss 18 cored at 19 to receive the shaft 11 and with a reduced angular shaped opening 20, to receive the cut away portion 12 of said shaft, whereby the said shaft and head 16 may be connected so that when rotative movement is imparted to the shaft 11 thru the gearing 9 and 13 similar movement may be imparted to the head 16.

It will be apparent from an examination of Fig. 1 that the head 16 is readily attachable to and detachable from the protruding end of the shaft 11, without the use of tools of any kind, and likewise the saucer 14 is attachable to and detachable from the upstanding bearing 2, without the use of tools of any kind. The head 16 being constructed to overhang and surround the bearing 2 and extending down into the saucer below the upper edge of the flange 15, the juices extracted from fruit by the rotation of the head will flow readily into the saucer and the latter being freely movable on the frame 1 may be moved to any position, and by inclining the floor of the saucer, as shown, in the direction of the mouth 16, the juices will be readily discharged from the saucer into a receptacle. The simplicity of the construction and the arrangement of the several elements, as shown, makes for sanitation, and by corrugating or fluting the surface of the head juice will be extracted from fruit and leave the pulp attached to the rind thereof.

What I claim is:—

1. A fruit juice extractor, comprising a frame having a substantially plane surface, a vertically extending sleeve formed integral with said surface, a rotatable saucer having a substantially plane bottom and a vertically extending sleeve adapted to receive the first mentioned sleeve and to rest upon said surface of the frame, a shaft journaled in the frame and extending through the said surface of the frame and saucer, an extracting head carried by said shaft, and means to rotate the shaft and head.

2. A fruit juice extractor, comprising a frame having a substantially plane top surface and a vertical sleeve integral with and extending above said surface, a vertical shaft journaled in the sleeve and extending above and below the latter and having its upper and lower ends free, a bevel gear on the said free lower end of the shaft, a horizontal operating shaft carried by the frame and having a bevel gear meshed with the gear of the vertical shaft and supporting the latter and its said gear, the free upper end of the vertical shaft having an angular part, a saucer having a substantially plane bottom and an upwardly extending sleeve to receive the first mentioned sleeve and being seated at its bottom on said top surface of the frame so as to be rotatably supported by said top surface, and an extracting head mounted on the free upper end of the vertical shaft and formed with a socket receiving the angular part of the vertical shaft.

3. A fruit juice extractor, comprising a frame having a supporting surface, a saucer formed to be rotatably supported by the said supporting surface, a shaft journaled in the frame and extending through the said supporting surface and saucer, an extracting head carried by said shaft, and means to rotate the shaft and head.

In witness whereof, I have hereunto affixed my hand this 12th day of September, 1923.

JOHN K. CURRY.